July 10, 1956
R. M. DILWORTH
2,753,814
RAILWAY VEHICLE TRUCK
Filed Dec. 29, 1952
4 Sheets-Sheet 2
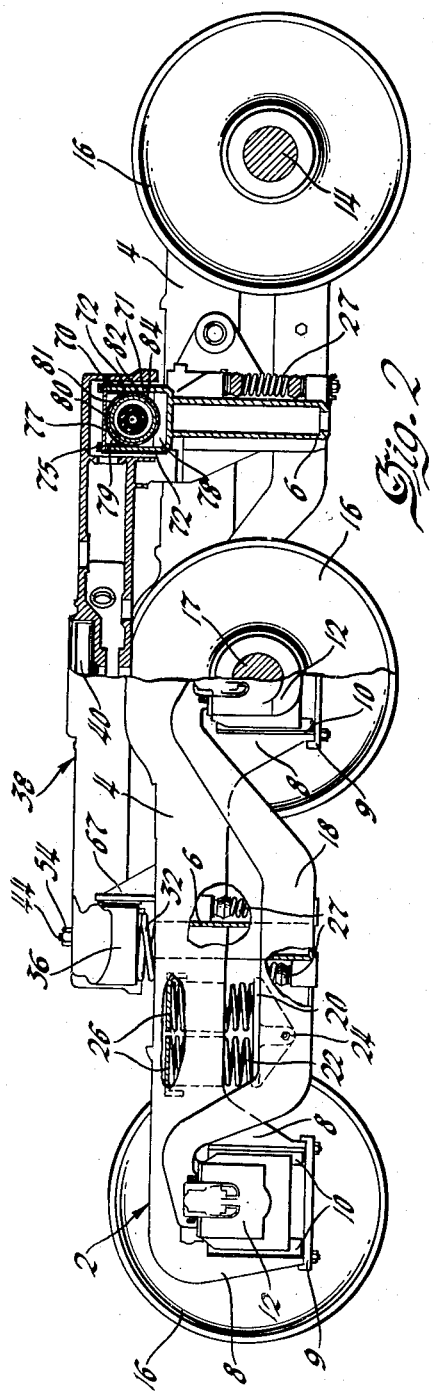
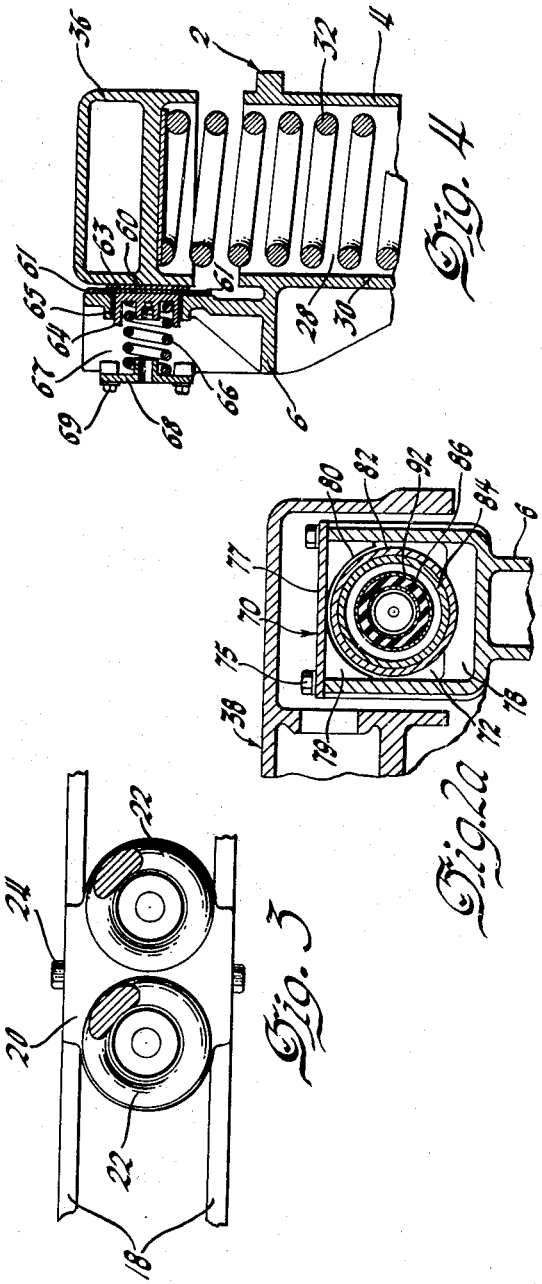
Inventor
Richard M. Dilworth
By
Willits, Helmig & Baillio
Attorneys July 10, 1956    R. M. DILWORTH    2,753,814
RAILWAY VEHICLE TRUCK Filed Dec. 29, 1952    4 Sheets-Sheet 3

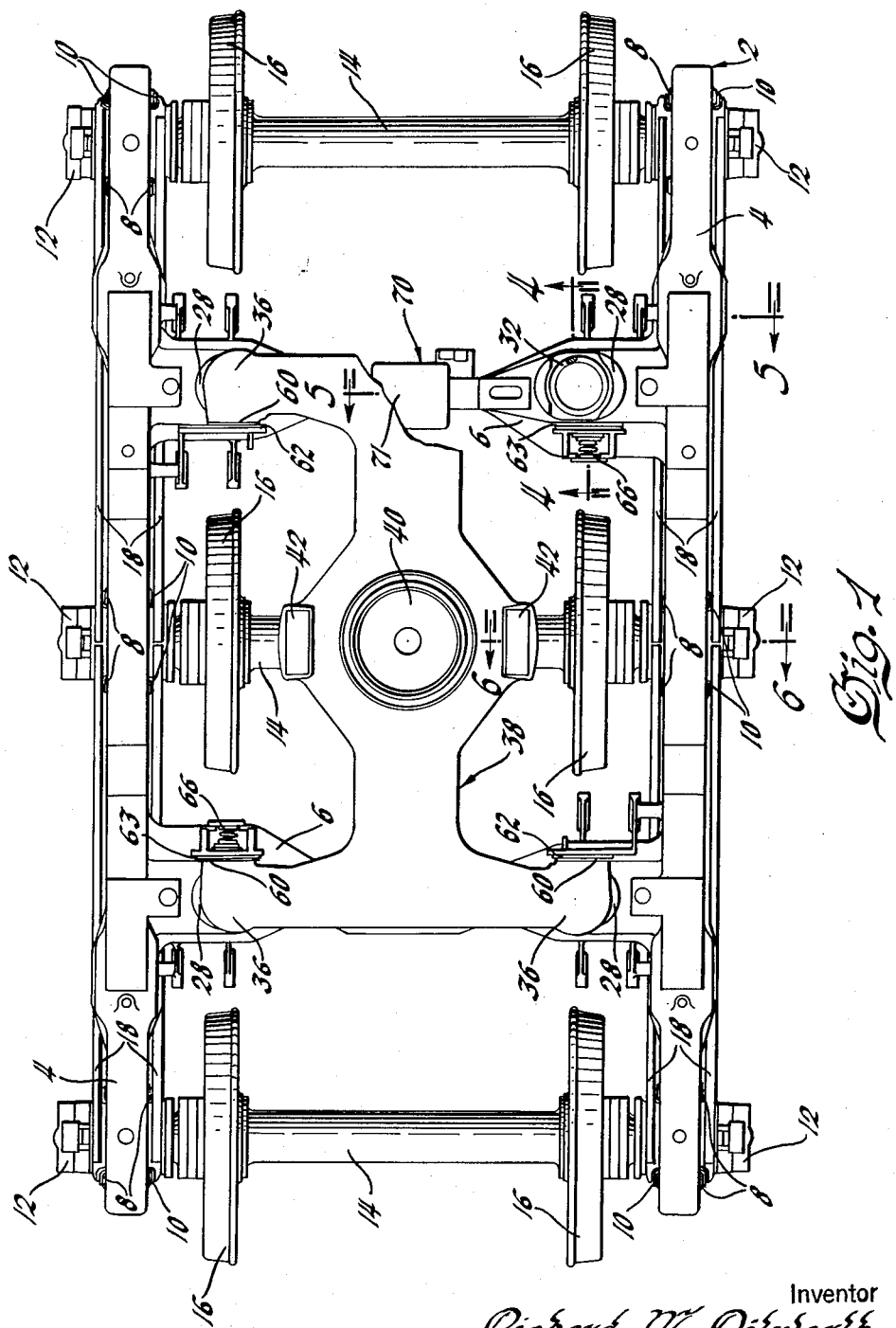

Inventor
Richard M Dilworth
By
Willits, Helmig & Baillio
Attorneys

July 10, 1956 R. M. DILWORTH 2,753,814
RAILWAY VEHICLE TRUCK
Filed Dec. 29, 1952 4 Sheets-Sheet 4
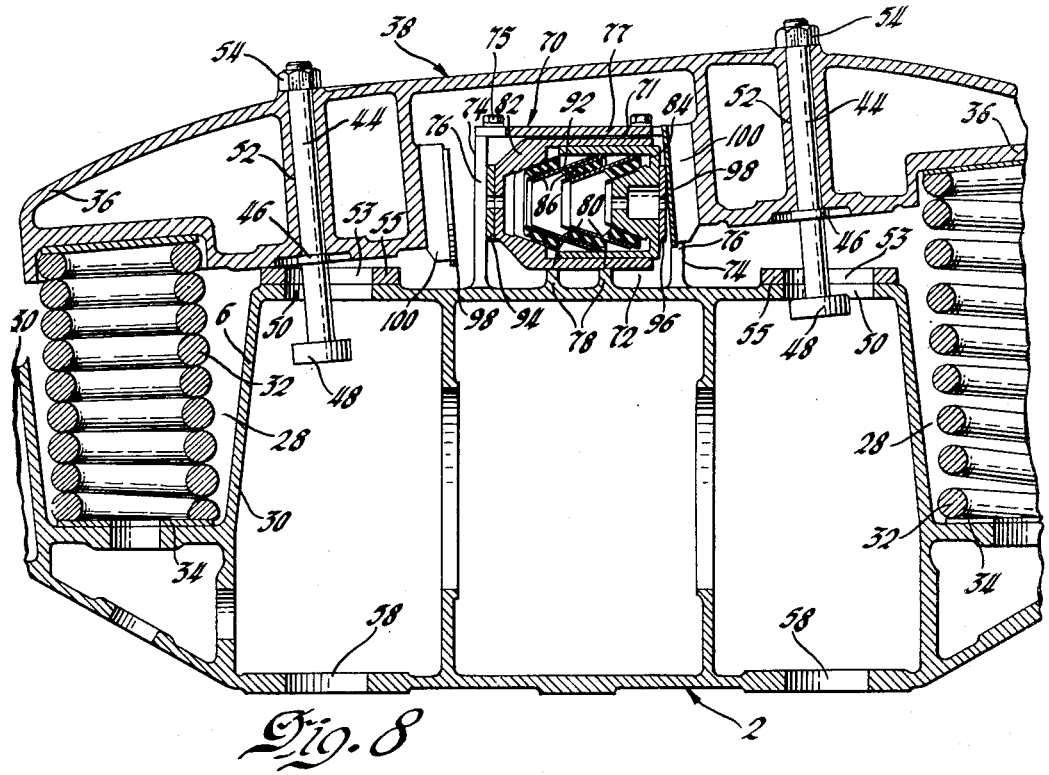
Fig. 8
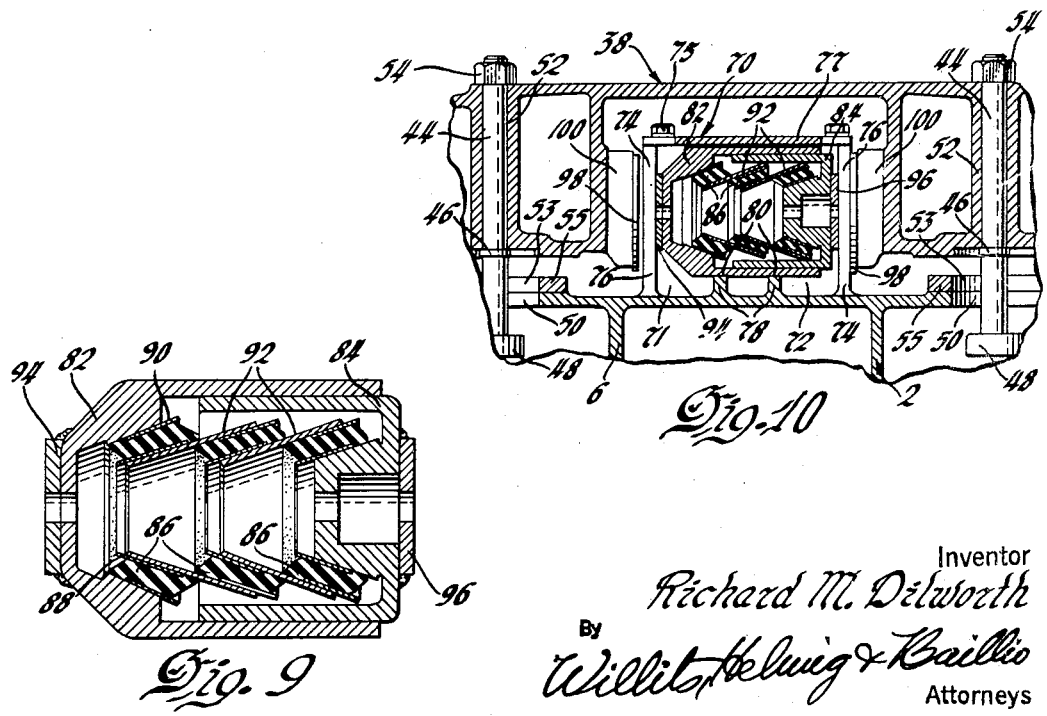
Fig. 9
Fig. 10
Inventor
Richard M. Dilworth
By Willits, Helwig & Baillio
Attorneys

United States Patent Office 2,753,814
Patented July 10, 1956

2,753,814

RAILWAY VEHICLE TRUCK

Richard M. Dilworth, Hinsdale, Ill., assignor to General Motors Corporation, Detroit, Mich., a corporation of Delaware Application December 29, 1952, Serial No. 328,377

9 Claims. (Cl. 105—193)

This invention relates to locomotive traction trucks and in particular to improvements therein to accomplish better riding qualities with less yawing, and to provide improved snubbing of the truck elements with respect to each other.

One object of the invention is to provide in a locomotive traction truck a pair of diagonally spaced end facing dead chafing means and a pair of diagonally spaced live end facing snubber means disposed between the truck frame and the spring supported bolster thereon, the combined action of which serve to aid in the reduction of yawing, to provide a more gradual take-up of clearance between the bolster and the truck frame, and to generally improve the riding qualities of the locomotive.

Another object of the invention is to provide, in a locomotive traction truck having a wheeled frame and a bolster thereon spring supported on the frame transome members, longitudinally spaced transversely disposed cushioned shock absorbing means serving as a lateral stop after permitting a predetermined lateral movement between the bolster and the frame.

A further object of the invention is to provide in a locomotive traction truck a novel arrangement of elements including spring means serving as the sole support of the bolster thereof, diagonally spaced dead chafing means and diagonally live end facing snubber means, transversely disposed cushion shock absorbing means serving as a lateral stop after permitting a predetermined lateral movement between the bolster and the frame, stop means adjacent each bolster supporting spring limiting downward movement toward said frame, and anti-separating means at each of said last mentioned stop means allowing for lateral movement of said bolster with respect to said truck frame within the limits of the movement permitted the said transversely disposed cushion shock absorbing means, the said elements cooperating to provide improved riding qualities of said traction truck during the diverse movements thereof during locomotive operating conditions.

Another object of the invention is to provide a locomotive traction truck in which the several elements thereof cooperate, each in their specific function, in an improved manner to accomplish smoother riding qualities, positive absorption of operating shocks, and self righting of the bolster and locomotive body carried thereby to normal ride position without undue overtravel of the bolster from any extreme position past its normal position.

Other objects of the invention will become apparent by reference to the following detailed description taken in connection with the accompanying drawings, in which:

Figure 1 is a plan view of a six-wheel locomotive truck embodying the invention, a portion of the bolster thereof being broken away to more clearly show one of its supporting springs.

Figure 2 is a side view, part in elevation and part in section, certain portions being broken away to indicate the truck springing.

Figure 2a is an enlarged view of a sectional portion of Figure 2 and shows in detail certain elements in part forming the new transverse shock absorbing means.

Figure 3 is a horizontal sectional view taken on the line 3—3 of Figure 5.

Figure 4 is an enlarged vertical sectional view taken on the line 4—4 of Figure 1, showing one of the bolster supporting springs and a live end facing snubber means.

Figure 8 is a fragmentary sectional view similar to Figure 5 with the bolster shown in an extreme lateral position with respect to the truck transom.

Figure 9 is an enlarged sectional view through the transverse cushion shock absorbing means preferably employed.

Figure 10 is a fragmentary sectional view similar to Figure 8 showing the truck bolster and the truck frame in their normal relationship with respect to each other.

Figure 5:
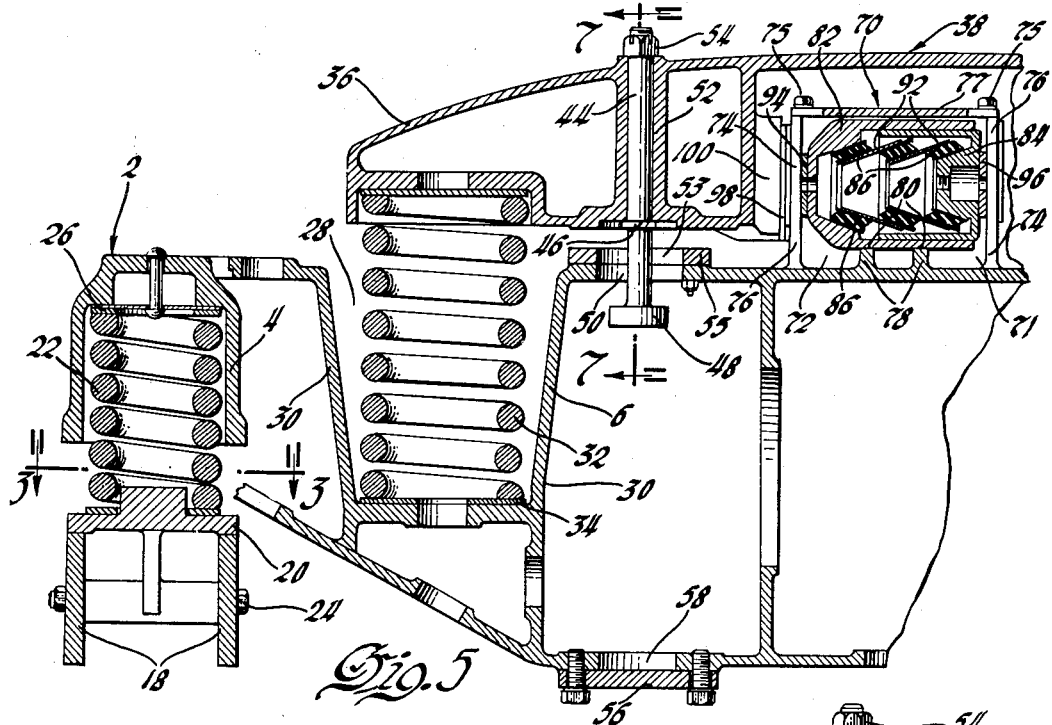
Figure 5 is an enlarged fragmentary sectional view taken on the line 5—5 of Figure 1 with the bolster supported on its spring supporting means in its normal horizontal position with respect to the truck transom.

The locomotive truck as shown in Figures 1 and 2 includes an integrally formed truck frame indicated generally by the numeral 2. The truck frame 2 is made up of longitudinally extending side members 4 and transversely extending transom members 6. Each of the side frame members 4 is provided with three pairs of downwardly extending pedestals 8. The pedestals 8 are provided with pedestal tie bars 9 and pedestal liners 10 which slidingly retain journal box assemblies 12. The journal box assemblies 12 provide bearing means for the axles 14 to which the usual wheels 16 are attached. Extending between the center axle 14 of the truck and the outer axles 14 are four sets of drop center equalizer bars 18 whose ends engage the upper sides of the journal boxes 12. Each set of equalizer bars 18 is composed of two members which are oppositely disposed with respect to the associated side frame member 4.

Referring now to Figures 1, 3 and 5 it may be seen that each set of equalizer bars 18 has a platform 20 fastened thereto by a bolt assembly 24. Each of the platforms 20 has seated thereon a pair of helical coil springs 22. The springs 22 extend up and into the underside of side frames 4 to engage the spring shims 26 and resiliently support the truck frame 2 on the equalizer bars 18.

Since the usual traction motors for this type of truck add nothing to the disclosure of this invention, they have been omitted for the sake of clarity. Resilient traction motor mounts have been shown in Figure 2, however, and these motor mounts are indicated generally by the numerals 27. Each motor mount 27 resiliently supports one end of a traction motor, the other end of the motor being supported on the adjacent axle 14.

Figures 5 and 8 illustrate how the transom frame members 6 are provided with spring pockets 28 having upwardly diverging walls 30 in which are seated helical coil springs 32 on the spring shims 34 to resiliently support the ends 36 of an H-shaped bolster 38 on the truck frame 2. The bolster 38 is provided with the usual center pivot 40 to pivotally support a railway vehicle body. The bolster 38 is also provided with oppositely disposed friction surfaces 42 positioned transversely on each side of the center pivot 40 to increase the stability of the vehicle body.

Portions of Figures 5, 7, 8 and 10 serve to illustrate one of four anti-separating means which prevent the bolster from being completely removed from the truck frame 2 after predetermined movement. Each anti-separating means consists of a bolt 44 having a flange 46 intermediate its ends and a large, flat head 48. The bolt 44 is inserted through an elongated slot 50 in the transom member 6 of the truck frame 2 and through a boltway 52 in an end 36 of the bolster 38 where it is securely fastened by the flange 46 and a nut 54.

The bolt 44 also passes through an adjacent slot 53 in an abutting vertical stop 55 which is attached to the upper side of the transom member 6 to limit downward movement of the bolster 38 with respect to the frame 2. By elongating the slots 50 and 53 the bolster 38 is permitted a certain amount of lateral movement as well as a certain amount of vertical movement before the large flat heads 48 engage an inner surface of the transom member 6. The bolt 44 is inserted into the slots 50, 53 and the boltway 52 from the inside of the transom member 6. This is accomplished by removing a cover plate 56 and placing the bolt 44 inside the transom member 6 through a hole 58 in the bottom of the transom member.

To describe how longitudinal movement may be transmitted between the frame 2 and the bolster 38 and also how lateral and vertical movement of the bolster with respect to the frame may be frictionally resisted and damped, reference is made to Figures 1, 2 and 4 where it may be seen that the ends 36 of the bolster 38 are each provided with longitudinal center facing wear or chafing plates 60. Each of the wear plates 60 engages a corresponding wear or chafing plate mounted on the transom members 6 of the truck frame 2. However, the wear plates on the transom members 6 are divided into two diagonal sets, one being the wear plates 61 and 62 which are rigidly secured to the transom members 6 and the other being the wear plates 63 are resiliently secured to transom members 6. Figure 4 shows one of the wear plates 63 and its resilient mounting on an upstanding projection 67 of the transom member 6. The wear plate 63 is attached to a small plunger 64 riding in a bore 65 formed in the projection 67 on the transom member 6. The plunger 64 is loaded by means of a small helical spring 66 abutting the plate 68 fastened by bolts 69 to the back side of the projection 67. The spring 66 causes the wear plate 63 to frictionally engage the associated wear plate 60 on a bolster arm 36. It may be noted, however, that if the spring 66 is compressed a sufficient amount, the wear plate 60 on bolster end 36 will also engage the wear plate 61 rigidly attached to projection 67 on the transom frame 6.

In order to limit the lateral movement of the bolster 38 with respect to the truck frame 2 a pair of longitudinally spaced resilient lateral stop assemblies 70 have been provided as projections on the upper sides of each transom member 6 at the center thereof. These lateral stop assemblies 70 and their manner of operation are best shown in Figures 2a and 5 and Figures 8–10 and include a housing 71 having longitudinal facing sides 72 and laterally facing ends 74, the ends 74 having openings 76 therein. The housing 71 is also provided with a top plate 77 secured to the housing 71 by means of bolts 75. Attached to the top plate 77 are a pair of downwardly facing arcuate supporting ribs 79. Located within the housing 71 are two transversely extending ribs 78 having small arcuate recesses 80 in their upper surface which mate with the supporting ribs 79 to form a pair of cylindrical openings 81. Positioned within the housing 71 in the cylindrical openings 81 and seated on the ribs 78 is a lateral shock absorber assembly comprising an outer cylindrical housing 82 and an inner cylindrical housing 84. Separating these two housings along their axis are three resilient thrust units each consisting of a rubber conical section 86 surrounded on each side by an inner conical shell 88 and an outer conical shell 90. These resilient thrust units are separated axially by two cones 92. The outer cylindrical housing 82 is provided with a lateral outwardly facing wear or chafing plate 94 which normally abuts the inner surface of one of the lateral facing ends 74. The inner cylindrical housing 84 is also provided with a lateral outwardly facing wear or chafing plate 96 which normally abuts the inner surface of the other laterally facing end 74. Each bolster arm of the bolster 38 is provided with oppositely disposed lateral inwardly facing wear or chafing plates 98 attached to lateral inwardly facing abutments 100 located on opposite sides of the resilient lateral stop assemblies 70. The wear plates 98 and the abutments 100 are adapted to alternately enter the opening 76 in the laterally facing ends 74 upon extended lateral movement of the bolster 38, where they alternately engage the wear plates 94 and 96 to cause sheering forces to act in the resilient thrust units and thereby rapidly increase the resistance to lateral movement of the bolster.

It may be appreciated at this point that the structure of this truck offers three types of resistance to lateral movement of the bolster 38 with respect to the truck frame 2, which, acting alone or in combination serve to give a railway vehicle truck of much finer riding quality. This may be explained by referring to Figure 8 where it may be observed that since the ends of the helical coil bolster springs 32 are more or less rigidly held in a substantially horizontal position, as the bolster 38 moves laterally with respect to the truck frame 2 the bolster springs 32 are deflected in such a way as to cause the longitudinal axes of the springs to assume S-shapes. This lateral S-shaped deflection of the springs 32 is considered very desirable because it tends to restore the bolster 38 to its static or central position. However, since the spring action attempting to restore the bolster 38 to its central position tends to be harmonic, the resilient diagonally spaced friction devices, which also aid in smoothly transmitting longitudinal movement between truck and bolster, are needed to quickly damp any harmonic action which might be caused by deflection of the springs 32. It may be noticed that when the lateral movement of the bolster with respect to the truck frame is extreme and cannot completely be overcome by the springs 32 and the diagonally spaced friction devices, one of the bolster wear plates 98 abuts either the wear plate 94 or the wear plate 96 of the resilient lateral stop assemblies 70 to rapidly increase the resistance to lateral movement of the bolster and finally prevent any further lateral movement of the bolster. Under such extreme conditions the springs 32, the spring loaded wear plates 63, and the resilient lateral stop assemblies 70 are all resisting lateral movement of the bolster. The unique structure just described has eliminated the necessity of hydraulic lateral shock absorbers on railway vehicle trucks because it prevents the solid lateral limit stops between bolster and frame from contacting with any material force.

It has been stated earlier in the description of this invention that only two of the motion transmitting chafing plates on the truck frame are resiliently mounted and that these resiliently mounted chafing plates are diagonally spaced. It has also been stated that the rigid pair of motion transmitting chafing plates mounted on the truck frame are diagonally spaced. It has been found that by using two diagonally spaced resiliently mounted chafing plates on the truck frame, friction snubbing is achieved between the bolster and the frame at all times to damp lateral and vertical movement of the truck bolster with respect to the truck frame. Another important advantage of this type of structure is that since one of these resiliently mounted chafing plates is always in engagement with one of the associated chafing plates on the bolster, the slack between the bolster and frame will be taken up more gradually thereby materially reducing the shock normally obtained when the frame first begins to transmit movement to the bolster. This structure also tends to very slightly bias the bolster with respect to the truck frame which decreases the amount of clearance between the rigidly fastened chafing plates on the bolster and frame and further aids in reducing the shock obtained when motion is transmitted from the frame to the bolster. In other words, these diagonally spaced resiliently mounted chafing plates reduce the amount of clearance between the rigidly mounted bolster and frame chafing plates and also cause this clearance to be taken up more gradually, and in addition act as lateral and vertical damping means between bolster and frame.

Figure 6:
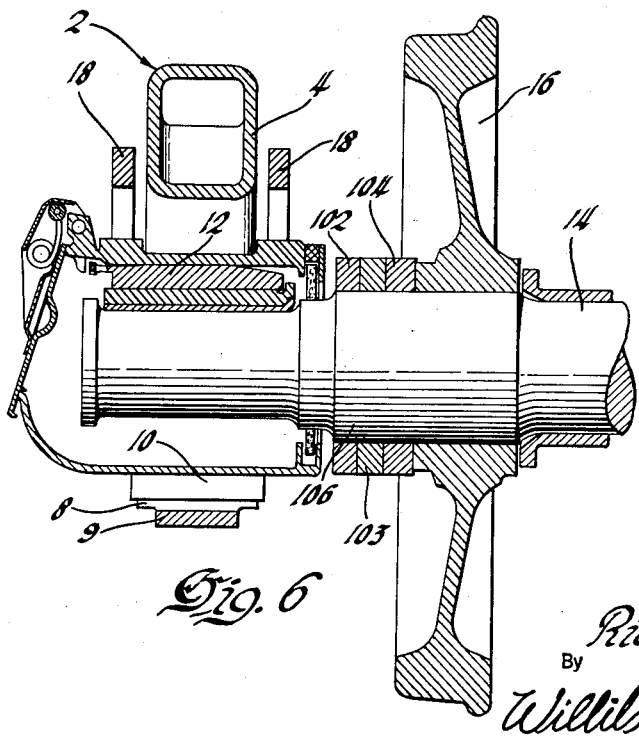
Figure 6 is an enlarged sectional view taken on the line 6—6 of Figure 1 showing the wheel mounting construction employed to permit the locomotive to be accommodated to different track gages.
Figure 7:
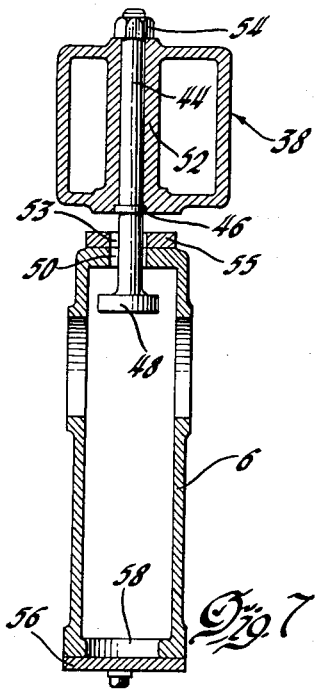
Figure 7 is a vertical sectional view taken on the line 7—7 of Figure 5 showing a preferred bolster-truck frame anti-separating means.

A further advantage of this railway vehicle truck is illustrated in Figure 6, wherein it is shown how the wheels of the truck may be placed in different lateral positions on the axle 14 to adapt the truck for the different gauge railroads often encountered in various countries. This is done by assembling the spacer members 102, 103 and 104 and the wheel 16 in different combinations on the wheel boss 106.

I claim:

1. A railway vehicle truck including a plurality of axles having wheels thereon, a truck frame supported on said axles, a truck bolster resiliently supported on said frame, a pair of upstanding diagonally spaced projections on said frame, a pair of spring-loaded longitudinal end facing chafing plates movably supported by said projections, a second pair of upstanding diagonal projections on said frame, a pair of longitudinal end facing chafing plates rigidly attached to said second pair of diagonally spaced projections, a pair of diagonally positioned longitudinal center facing chafing plates on said bolster and engaging said spring-loaded chafing plates on said frame whereby a turning moment is applied to said bolster relative to said frame, and a second pair of diagonally positioned longitudinal center facing chafing plates on said bolster engaging said second pair of upstanding diagonal projections on said frame to transmit longitudinal movement of said frame to said bolster and counteract said moment.

2. A railway vehicle truck comprising a truck frame supported on rotatable wheels and axles and composed of longitudinally extending side members retained in parallel relationship by transversely extending longitudinally spaced transom members, said transom members having recesses equidistant from the longitudinal center line of said truck and on opposite sides thereof, said recesses being formed by downwardly converging walls which terminate in a spring seat, helical coil springs seated in said recesses and on said seats, a truck bolster having laterally extending arms resiliently supported on said transom members by said springs, and lateral shock absorbing means on said transom members including a pair of laterally extending telescopic stops resiliently maintained apart and adapted to be alternately engaged by lateral inwardly facing surfaces on said bolster after predetermined lateral movement of said bolster with respect to said frame.

3. A railway vehicle truck comprising a frame having supporting wheels and axles rotatably attached thereto, a bolster resiliently supported on said frame, lateral shock absorbing means movably attached to said frame and including a pair of telescoping hollow cylindrical members maintained apart by a plurality of conically shaped resilient elements acting in series, said cylindrical members being provided with oppositely disposed lateral outwardly facing surfaces, and inwardly facing lateral surfaces on said bolster adapted to alternately engage said outwardly facing surfaces after predetermined relative movement of said bolster with respect to said frame.

4. A railway vehicle truck comprising a frame supported by rotatable axles and wheels and composed of longitudinally extending side frame members retained in parallel relationship by longitudinally spaced transversely extending transom members, oppositely disposed spring seats contained in said transom members and equidistant from opposite sides of the longitudinal center line of said truck, helical coil springs residing on said seats, a truck bolster having longitudinally spaced transversely extending arms supported at the extremities of said arms on said helical springs for limited lateral movement of said bolster with respect to said frame, lateral shock absorbing means movably attached to said transom members along the longitudinal center line of said truck and having lateral outwardly facing surfaces retained apart by resilient means interposed therebetween, and oppositely disposed lateral inwardly facing surfaces on the arms of said bolster, said inwardly facing surfaces being alternately engageable with said outwardly facing surfaces to resist lateral movement of said bolster with respect to said frame.

5. A railway vehicle truck including a truck frame having supporting wheels and axles rotatably attached thereto, said truck frame having longitudinal side frame members and transverse transom members, a bolster having longitudinally spaced transversely extending arms resiliently supported on said transom members, and means to resist transverse movement between said truck frame and said bolster comprising helical coil springs seated in pockets in said transom members and supporting the ends of said bolster arms, said means including diagonally spaced spring-loaded plungers having wear plates facing longitudinally toward the adjacent end of said truck and engaging wear plates on said bolster facing longitudinally toward the center of said truck, said means also including lateral outwardly facing outwardly biased surfaces movably supported on said transom frames at the center thereof, said outwardly facing surfaces projecting upwardly and extending between lateral inwardly facing surfaces on said bolster to alternately engage said surfaces after predetermined lateral movement of said bolster relative to said frame.

6. A railway vehicle truck comprising a frame having supporting wheels and axles rotatably attached thereto, a truck bolster resiliently supported on said frame, resilient means acting between said bolster and said frame to transmit longitudinal movement between said bolster and said frame, and lateral shock absorbing means attached to said frame, said shock absorbing means having lateral outwardly facing surfaces retained apart by resilient means interposed therebetween, said surfaces adapted to be alternately engaged by lateral inwardly facing surfaces on said bolster after predetermined lateral movement of said bolster with respect to said frame.

7. A locomotive truck comprising a frame having supporting wheels and axles rotatably attached thereto, a truck bolster resiliently supported on said frame and having longitudinal center facing chafing plates attached thereto, a pair of upstanding diagonally spaced projections attached to said frame and movably supporting spring loaded longitudinal end facing chafing plates which act against said longitudinal center facing chafing plates on said bolster to transmit longitudinal movement of said frame to said bolster, lateral shock absorbing means movably attached to said frame and including a pair of telescoping hollow cylindrical members maintained apart by a plurality of conically shaped resilient members acting in series, said cylindrical members being provided with oppositely disposed lateral outwardly facing surfaces, and lateral inwardly facing surfaces on said bolster adapted to alternately engage said outwardly facing surfaces after predetermined relative movement of said bolster with respect to said frame.

8. A traction truck comprising a wheeled truck frame, a bolster having laterally and longitudinally spaced arms, spring means carried by said truck frame supporting said bolster at the ends of said arms, a pair of diagonally spaced dead end facing chafing means and a pair of diagonally spaced live end facing snubber means fixed in operating relationship to said truck frame and said bolster adjacent the ends of said bolster, a pair of longitudinally spaced transversely disposed lateral snubber elements limiting transverse movement of said bolster in respect to said truck frame, vertical stop means disposed on each side of said lateral snubber elements limiting downward movement of said bolster toward said truck frame, and antiseparating means at said vertical stop means preventing separation of said bolster from said truck frame.

9. A locomotive traction truck comprising a frame composed of longitudinal side members and transverse transom members, a plurality of axles including wheels and journal elements thereon, longitudinally disposed drop-center equalizer bars supported on said journal elements and extending therebetween, frame supporting spring elements carried by said equalizer bars for supporting said frame at the side members thereof, an H-shaped bolster on which the locomotive is mounted having longitudinally spaced laterally extending arms, spring means carried by said transom members for supporting said bolster at the ends of the laterally extending arms thereof, a pair of end facing chafing plates carried by each of said transom members and cooperating with a pair of center facing chafing plates carried by each of said bolster arms, a spring-loaded end facing snubber carried by each of said transom members with each snubber acting against one of said center facing chafing plates, said snubbers being diagonally disposed with respect to the longitudinal and transverse center lines of said truck, a transversely disposed horizontal rubber-cushioned telescoping shock absorbing element carried by each transom member at the transverse center thereof and adapted to engage transversely spaced stop plates on said bolster, said stop plates being located at the intersection of each end of the longitudinal portion of said bolster and the lateral arms extending therefrom, said telescoping shock absorber elements being slidably mounted in said transom members to serve as resilient stops after permitting a predetermined limited amount of lateral movement between said bolster and said frame, longitudinally and transversely spaced stop means located adjacent each of said bolster supporting spring means to limit the downward movement of said bolster toward said frame, and anti-separating devices vertically disposed through each of said last mentioned stop means to prevent further separation of said bolster and said truck frame after limited lateral and vertical movement of said bolster with respect to said frame.

References Cited in the file of this patent

UNITED STATES PATENTS

| | | |
|---|---|---|
| 2,190,728 | Mohun et al. | Feb. 20, 1940 |
| 2,348,453 | Couch | May 9, 1944 |
| 2,492,337 | Travilla | Dec. 27, 1949 |
| 2,551,064 | Spenner | May 1, 1951 |
| 2,573,165 | Settles | Oct. 30, 1951 |
| 2,609,757 | Blomberg | Sept. 9, 1952 |